United States Patent
Brooks et al.

(10) Patent No.: US 9,653,067 B2
(45) Date of Patent: *May 16, 2017

(54) INTERPRETATION OF NATURAL COMMUNICATION

(71) Applicant: FMR LLC, Boston, MA (US)

(72) Inventors: Seth Warren Brooks, South Easton, MA (US); Ronald M. Raikula, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,365

(22) Filed: Aug. 26, 2014

(65) Prior Publication Data

US 2015/0262573 A1    Sep. 17, 2015

Related U.S. Application Data

(63) Continuation of application No. 14/204,106, filed on Mar. 11, 2014, now Pat. No. 8,825,585.

(51) Int. Cl.
| | | |
|---|---|---|
| *G06F 17/00* | (2006.01) | |
| *G06N 5/02* | (2006.01) | |
| *G10L 15/02* | (2006.01) | |
| *G10L 15/18* | (2013.01) | |
| *G06K 9/00* | (2006.01) | |

(52) U.S. Cl.
CPC ............ *G10L 15/02* (2013.01); *G06K 9/0061* (2013.01); *G06K 9/00268* (2013.01); *G06K 9/00355* (2013.01); *G10L 15/1815* (2013.01)

(58) Field of Classification Search
None
See application file for complete search history.

(56) References Cited

U.S. PATENT DOCUMENTS

| | | | | |
|---|---|---|---|---|
| 7,302,392 | B1* | 11/2007 | Thenthiruperai | G10L 15/19 704/251 |
| 8,244,522 | B2* | 8/2012 | Nakano | G06F 17/2775 704/1 |
| 8,296,151 | B2* | 10/2012 | Klein | G06F 3/017 382/181 |
| 2002/0135618 | A1* | 9/2002 | Maes | G06F 3/0481 715/767 |
| 2008/0187121 | A1* | 8/2008 | Agarwal | H04M 3/4931 379/218.01 |
| 2010/0241431 | A1* | 9/2010 | Weng | G06F 3/038 704/257 |
| 2012/0209594 | A1* | 8/2012 | Agarwal | H04M 3/4931 707/722 |

* cited by examiner

*Primary Examiner* — Luis Sitiriche
(74) *Attorney, Agent, or Firm* — Proskauer Rose LLP

(57) ABSTRACT

A computer-implemented method, including receiving by one or more computer systems input information that represents a multi-dimensional communication; detecting, based on contents of the input information, a plurality of communication inputs; applying one or more weighted values to one or more of the communication inputs; assigning, based on application of the one or more weighted values, confidence levels to the communications inputs; determining which of the confidence levels are below a confidence threshold; executing one or more disambiguation rules to disambiguate the communication inputs with confidence levels below the confidence threshold; and generating a communication instruction to perform an action that is specified by the multi-dimensional communication.

21 Claims, 6 Drawing Sheets

INTERPRETATION OF NATURAL COMMUNICATION

CLAIM OF PRIORITY

This application is a continuation of claims priority under 35 U.S.C. §120 to U.S. patent application Ser. No. 14/204,106, filed Mar. 11, 2014, the entire contents of which are hereby incorporated by reference.

BACKGROUND

Speech recognition is the computer implemented conversion of electrical signals representative of spoken words into text characters, e.g., words, which can be stored and/or outputted or otherwise rendered on a display. Speech recognition applications include voice user interfaces such as voice dialing (e.g. "Call home"), call routing (e.g. "I would like to make a collect call"), domestic appliance control, search (e.g. find a podcast where particular words were spoken), simple data entry (e.g., entering a credit card number), preparation of structured documents (e.g. a radiology report), and speech-to-text processing (e.g., word processors or emails).

SUMMARY

In an implementation, a computer-implemented method includes receiving by one or more computer systems input information that represents a multi-dimensional communication; detecting, based on contents of the input information, a plurality of communication inputs; applying one or more weighted values to one or more of the communication inputs; assigning, based on application of the one or more weighted values, confidence levels to the communications inputs; determining which of the confidence levels are below a confidence threshold; executing one or more disambiguation rules to disambiguate the communication inputs with confidence levels below the confidence threshold; and generating a communication instruction to perform an action that is specified by the multi-dimensional communication. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some implementations, the actions include determining, based on execution of the one or more disambiguation rules, a meaning of the multi-dimensional communication. The generated communication instruction is based on the determined meaning Receiving further comprises: receiving a first one of the communication inputs; subsequently, receiving a second one of the communication inputs; determining that the first one of the communication inputs is a dependent communication input that is reliant on the second one of the communication inputs for disambiguation; determining an amount of time between the first one of the communication inputs and the second one of the communication inputs; and applying a time based weighted value to the first one of the communication inputs, with a value of the time based weighted value being inversely proportional to the determined amount of time. The actions include transmitting, to a client device, an audio prompt that requests additional information to promote disambiguation of at least one of the communication inputs with confidence levels below the confidence threshold. The actions include transmitting the communication instruction to a networked device for execution of the communication instruction. The multi-dimension communication includes one or more of speech, a facial gesture, an eye gaze, a physical motion, and a biometric measurement.

All or part of the foregoing may be implemented as a computer program product including instructions that are stored on one or more non-transitory machine-readable storage media and/or one or more computer-readable hardware storage devices that are a hard drive, a random access memory storage device, such as a dynamic random access memory, machine-readable hardware storage devices, and other types of non-transitory machine-readable storage devices, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DETAILED DESCRIPTION

Figure 1:
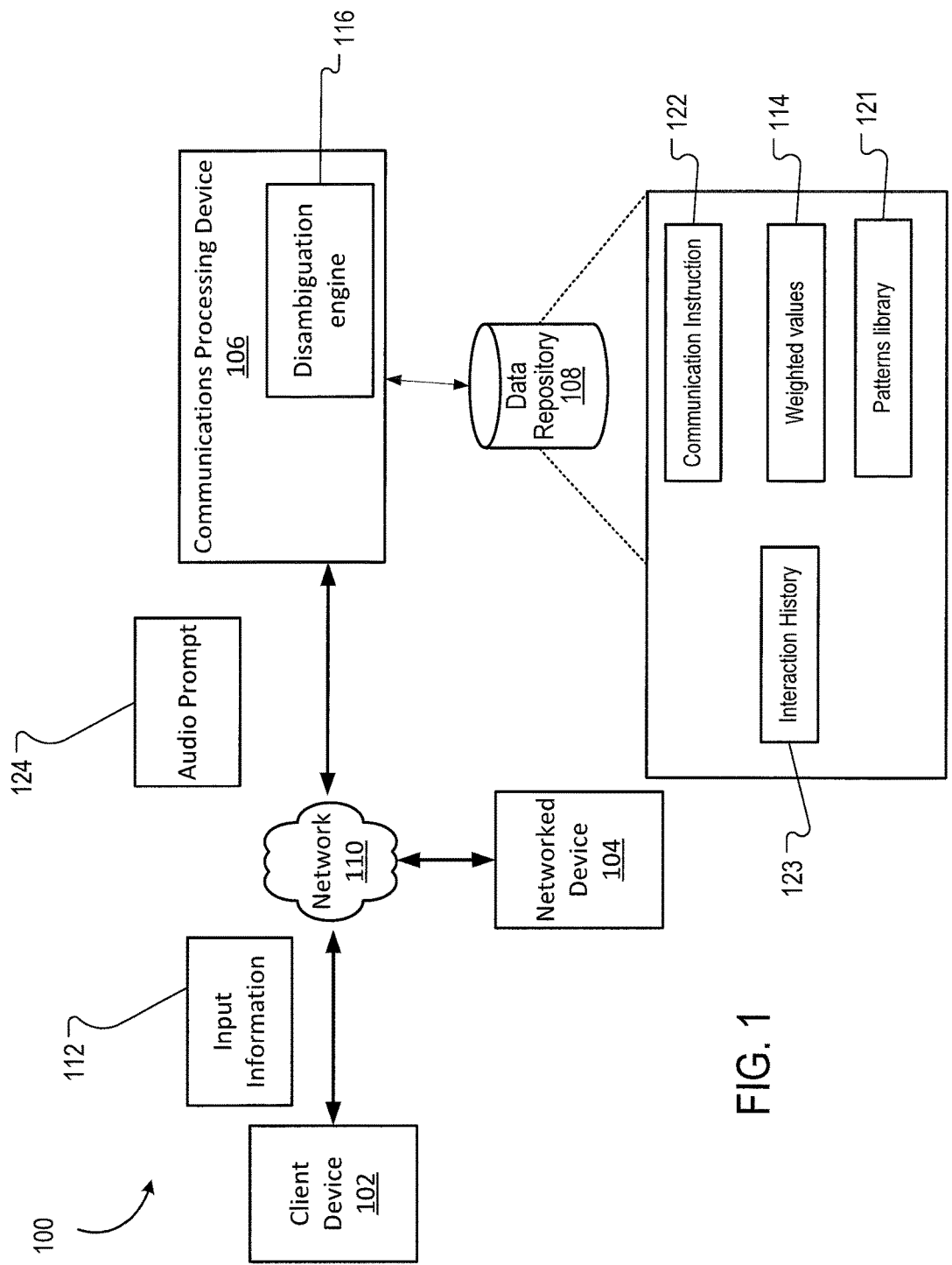
FIG. 1 is a diagram of a system for processing natural communications.

Referring to FIG. 1, system 100 includes client device 102, networked device 104, communications processing device 106, data repository 108 and network 110. Using client device 102, a user (not shown) issues commands to control networked device 104. Client device 102 captures input information 112 that is input into client device 102 by a user. Input information 112 includes a stream of information that represents a composite, multi-domain communication. A composite, multi-domain communication (composite communication) is a communication that incorporates at least two different communication domains, e.g., voice, gestures, eye movements and facial expressions. An example of a composite multi-domain communication is a verbal command to turn off a light accompanied a physical movement of pointing to a particular light to turn off.

There are various types of input information, including, e.g., sound information, audio information, video information, biometric information and so forth. Client device 102 includes various mechanisms for capturing input information 112, including, e.g., a microphone for capturing audio information, a video camera or other image recording device for capturing images and/or video, a touch screen for capturing user selection of various visual representations on the touch screen and for enabling a user to input various type of information, a biometric device for capturing biometric information, and so forth.

Client device 102 includes or more biometric devices for capturing various types of biometric data. There are various types of biometric devices, including, e.g., a device for measuring a heart rate, a pulse, an amount of pupil dilation, autonomic signals, and so forth. There are various types of biometric information, including, e.g., information indicative of a heart rate measurement, information indicative of a pulse measurement, information indicative of an amount of pupil dilation, and so forth.

Using network 110, client device 102 transmits input information 112 that represents the composite communication to communications processing device 106 for processing. Communications processing device 106 includes various algorithms for processing various components of the input information 112 according to whether the information component represents sound, sight and physical movements. These algorithms include a voice detection algorithm, an algorithm for measuring gross body movement, an algorithm for measuring eye gaze direction and movement, an algorithm for measuring fine motor movements (e.g. finger motions), an algorithm for measuring small muscle movements, and so forth.

Communications processing device 106 measures characteristics and attributes of the inputs provided by input information 112. As previously described, there are various types of inputs, e.g., audio inputs, physical inputs (i.e information indicative of physical movements), video inputs, biometric inputs and so forth.

When input information 112 includes audio information, communications processing device 106 determines the loudness of the sound, a staccato of the sound (e.g., a clipping in a person's voice) and so forth This is determined by comparing the measured sound or sequence of sounds against a pattern library (121) for the audio input channel, and based on pattern matching characterizes the sequence of sounds with some confidence interval. Similarly, when input information includes 112 information indicative of physical motions (e.g., that are captured via a camera on a client device), communications processing device 106 determines attributes of the physical motions, e.g., how quickly or broadly they gesture with their hand, how much their face is scrunched in anger, and so forth.

Communications processing device 106 assigns one or more weighted values 114 to the inputs included in input information 112 to specify the importance of some inputs relative to the importance of other inputs for processing of the multi-domain communication. Communications processing device 106 assigns weighted values 114 in accordance with weighting instructions, as shown in Table 1:

TABLE 1

| Type of input | Weighted value |
|---|---|
| Audio | 2 |
| Image | 1 |
| Video/physical movement | 4 |

As shown in Table 1, communications processing device 106 assigns a weighted value of two to an audio input, a weighted value of one to an image input, a weighted value of four to a video input. Based on the weighted values shown in Table 1 above, communications processing device 106 determines that video inputs are four times more important than image inputs to interpreting a natural communication. Communications processing device 106 also determines that a video input is twice as important as audio inputs to processing and interpreting a natural communication.

In a variation, communications processing device 106 determines a weighted value based on time and context of multiple inputs relative to each other. If a user speaks and that language is followed by silence, the longer the silence the less weight would be applied to a follow-up signal (such as a user saying "Turn on that light" but waiting for 10 seconds before pointing to a corner of a room).

Communications processing device 106 determines weighted values for inputs that are based on time and context, in accordance with the equation shown in the below Table 2.

TABLE 2

W = assigned weighted value/T

As shown in Table 2 above, W represents a weighted value and T represents a period of time between a first input (e.g., speech) and a second input (e.g., a movement). An assigned weighted value is a value that communications processing device 106 has pre-assigned to a particular type of input, e.g., as shown in Table 1.

Using the weighted values, communications processing device 106 assigns a confidence level (e.g., a certainty value) to the inputs included in input information 112, as described in further detail below. The confidence level is determined by the nature, degree, and precision of pattern match of the input information 112 processed by the communications processing device 106 and measured against the patterns library 121. In an example, input information 112 includes an image of a user pointing to a specific light and an audio command of "turn on a light". Communications processing device 106 determines the user's hand position relative to the light. When the user's hand is in proximity to the light or is pointing directly at the light, communications processing device 106 determines that the user's finger is pointing to the specific light and assigns a relatively high degree of confidence to the input that is the image of the user pointing to the specific light and to the input that is the audio command. The relatively high degree of confidence specifies that, based on the input, communications processing device 106 determines with a high degree of certainty the action that the user is requesting.

When input information 112 includes an audio input of "turn on a light" and an image input that displays an image of the user partially gesturing towards multiple lights, communications processing device 106 is unable to determine which light the user wants turned on. Communications processing device 106 assigns a relatively low confidence level to these inputs.

When an input has an assigned confidence level that is less than a confidence threshold, communications processing device 106 determines that a meaning of the input is ambiguous and executes disambiguation engine 116 to evaluation the meaning of the ambiguous input. Disambiguation engine 116 includes disambiguation rules that when executed perform various operations to disambiguate an ambiguous input. These operations include prompting a user for additional information and comparing an ambiguous input to a patterns included in a library, e.g., to determine a correspondence between the ambiguous input and one of the patterns.

Disambiguation engine 116 implements various techniques to determine a meaning of an ambiguous input including transmitting audio prompt 124 to client device 102. Audio prompts 124 prompts a user of client device 102 for additional information that clarifies the meaning of an ambiguous input. For example, input information 112 includes the audio input "turn on the light." In this example, communications processing device 106 detects ambiguity in the audio input, because communications processing device 106 is unable to determine which light (that is controlled by networked device 104) is to be turned on. In this example, communications processing device 106 generates audio prompt 124 that prompts the user for additional information about which light is to be turned on.

In a variation, upon detection of ambiguity in an input, disambiguation engine 116 accesses patterns library 121 that includes information indicative of prior actions that the user had requested and commands that were associated with those actions. For example, patterns library 121 includes information indicative of a command "turn on the light" and also includes information specifying which light in a room (that is controlled by networked device) should be turned on. Using contents of patterns library 121, disambiguation engine 116 identifies a command that is similar and/or the same as an input that is included in input information 112. For the identified command, disambiguation engine 116 uses other information that is associated with the identified command to determine a meaning for the ambiguous input.

Using the multiple and disambiguated inputs, communications processing device 106 determines if there are conflicts in input commands. Generally, a conflict occurs when inputs instruct communications processing device 106 to perform logically inconsistent actions, e.g., action that are the opposite of each other—such as a command to turn on the lights and a command to turn off the lights. When communications processing device 106 detects a conflict, communications processing device 106 will prompt the user for additional information that is used in resolving the conflict, e.g., information specifying which command to execute.

In another variation, communications processing device 106 detects a conflict among two or more inputs. The inputs are each associated with weighted values. To resolve the conflict, communications processing device 106 selects the input that is more heavily weighted, relative to the weighted values of the other conflicting inputs. The heavier assigned weight specifies that the input is a more predictable or reliable input, e.g., relative to the other inputs. The selected input is used in generating communication instruction 122.

Where commands are harmonious (i.e., free of conflicts), communications processing device 106 generates communication instruction 122 to perform an action. Communications processing device 106 transmits communication instruction 122 to networked device 104 which executes communication instruction 122 to cause performance of an action specified in communication instruction 122.

Communications processing device 106 also determines whether there are multiple instructions which are being broadcast within a same time interval. For example, a user points at a light and says "turn on the light and turn up the volume." Communications processing device 106 processes the input information to identify two audio inputs—one audio input to "turn on the light" and another audio input to "turn up the volume." In addition to the audio inputs, communications processing device 106 also detects gaze and motion inputs, e.g., a user saying "turn on a light" while looking at a specific light in the corner of a room and raising a hand quickly and very high. Using the motion inputs with the audio inputs, communications processing device 106 determines that the user wants to turn on a specific light at full brightness and generates a communication instruction to do.

In a variation, input information includes an audio input of "turn on the lights" and a motion input of raising a hand half way up the user's body. Based on these inputs, communications processing device 106 determines that the inputs are ambiguous as to which light to turn on. In response to the detected ambiguity, communications processing device 106 issues an audio prompts that prompts the user for additional information regarding which light to turn on. In another variation and in response to the detected ambiguity, communications processing device turns on all lights at half brightness. In this variation, one or more of the networked device 104 and the client device 102 execute an application (or other software) that records the actions of a user in the room that holds networked device 104. The application streams information indicative of the user's movements to communications processing device 106. Using the streamed information that is indicative of the user's movements, communications processing device 106 determines from the user's facial expression and movement in response to the lights being turned on at half brightness whether the interpretation of the input information is correct. If communications processing device 106 detects that the user wanted another light turned on, e.g., based on the user looking disappointed or subsequently pointing to another light, communications processing device 106 will prompt the user for additional information that specifies which light to turn on.

In an example, input information 112 includes a video of the user speaking the command "turn on a light" and then pointing to a specific light in the room soon after speaking the command. Communication processing device 106 parses the contents of the video to identify the two inputs, e.g., a vocalization of the words "turn on that light" and a visual measurement of a person pointing to a specific light in the room. Communications processing device 106 determines that the audio input "turn on that light" is a dependent input signal because the context of the words includes "that light", which indicates the user is trying to control a specific light. Soon after or during the utterance of the words, the user also points to the light. Communications processing device 106 determines that the motion of pointing at a specific object itself is an independent input because there is no other context to indicate whether additional inputs are forthcoming. In this example, communications processing device 106 assigned weights values to the audio input (e.g., "turn on a light") and to the physical input (e.g., the user pointing at the light) in accordance with the weighted rules as shown in Table 1.

Figure 2:
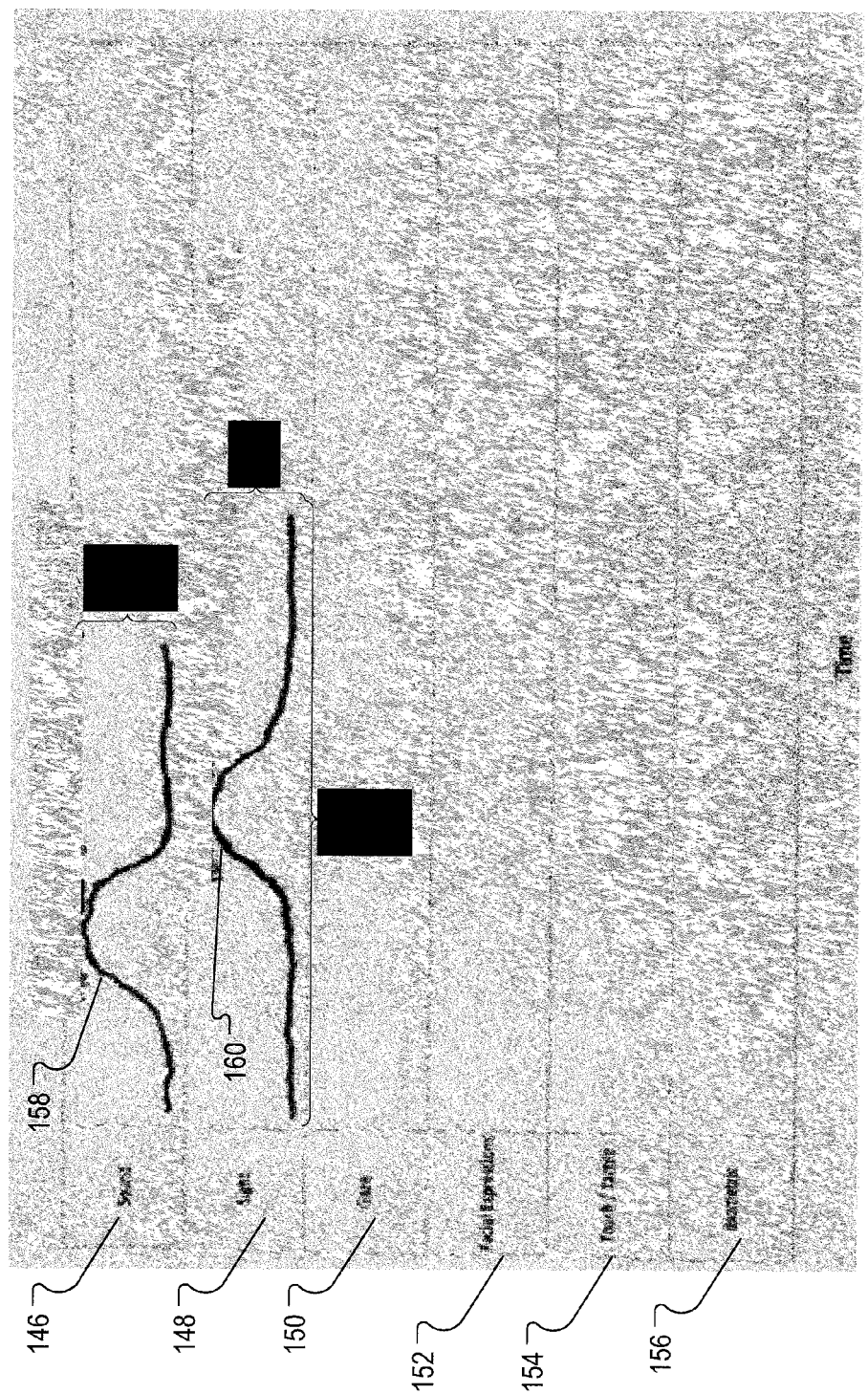
FIGS. 2, 3, 4A and 4B are diagrams of waveforms that are generated during processing of natural communications.

Referring to FIG. 2, communications processing device 106 (FIG. 1) analyzes input information to detect various different inputs, including, e.g., sound, sight, gaze, facial expressions, touch and biometric. Communications processing device 106 detects a sound input (e.g., the command "turn on that light") and a sight input of a user performing a physical action of pointing to a light, as indicted by waveforms 142, 144, respectively. The input information spans timeframe 157. The time frames can be measured from various portions of the waveforms, such as start of a leading edge of a waveform, an amount that exceeds a threshold or at a peak value. As shown, peak values 158, 160 of waveforms 142, 144 represent the portions of input information where a sound input and a sight input are detected, respectively. In this example, there is not a significant time lag between the sound input and the sight input.

Based on this insignificant time lag, the communications processing device 106 assigns weights to the sound input and the sight input in accordance with predefined weighting rules, e.g., as shown in Table 1. This would be an example where there is no detected ambiguity between two different domain inputs.

Figure 3:
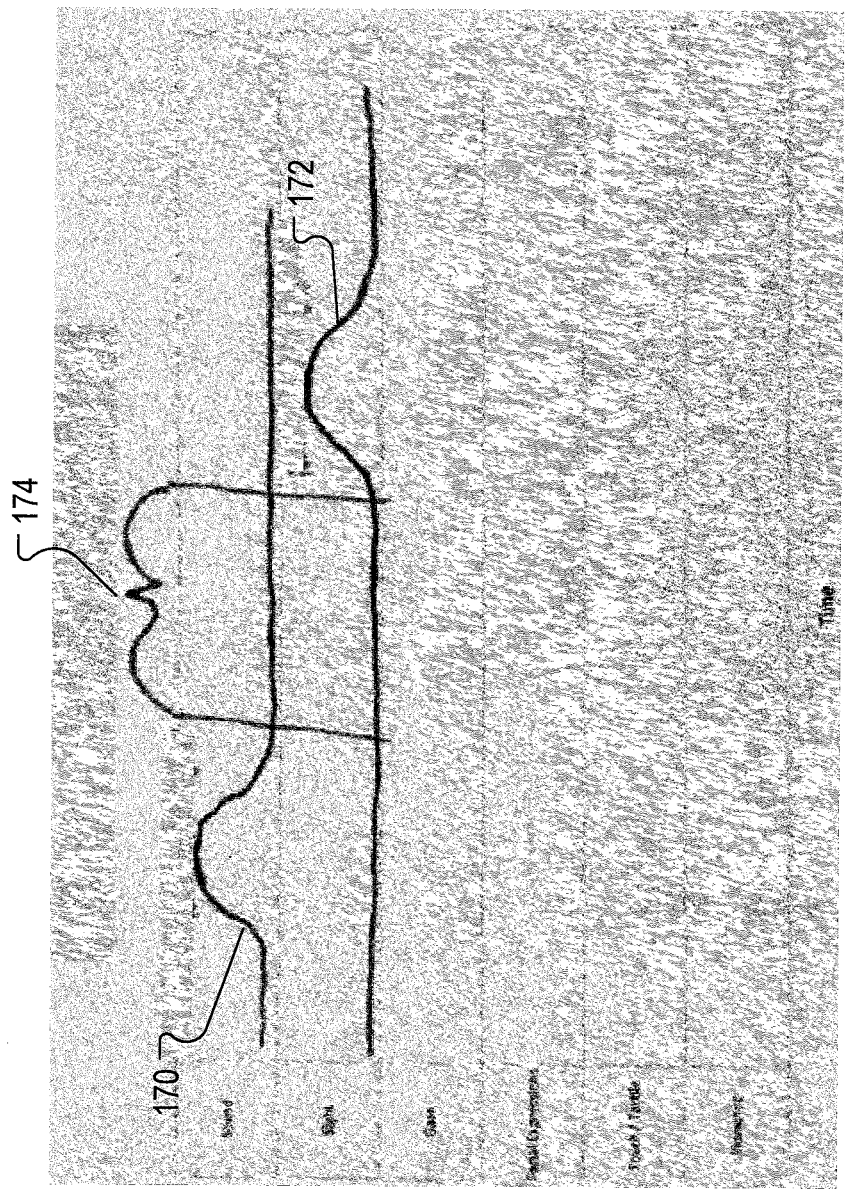

Referring to FIG. 3, communications processing device 106 detects sound input 170 and sight input 172 in input information, in a variation, where for example, a user says "turn on that light" and also points to a specific light in the room after a gap in time. Communications processing device 106 detects a relatively significant time lag (represented by visualization 174) between sound input 170 and sight input 172. Sound input 170 is an audio input "turn on that light" and is a dependent input signal because the context of the words "that light" indicates by the use of the relative pronoun "that" the communications processing device 106 determines that the user is trying to control a specific light. Sight input 172 includes a visual representation of a user pointing to a light. Due to the length of the time lag between sound input 170 and sight input 172, communications processing device 106 detects ambiguity regarding the meaning of the multi-domain communication represented by sound and sight inputs 170, 172 and executes disambiguation engine 116 to disambiguate the command. This would be an example where there is a detected ambiguity between two different domain inputs.

Figure 4A:
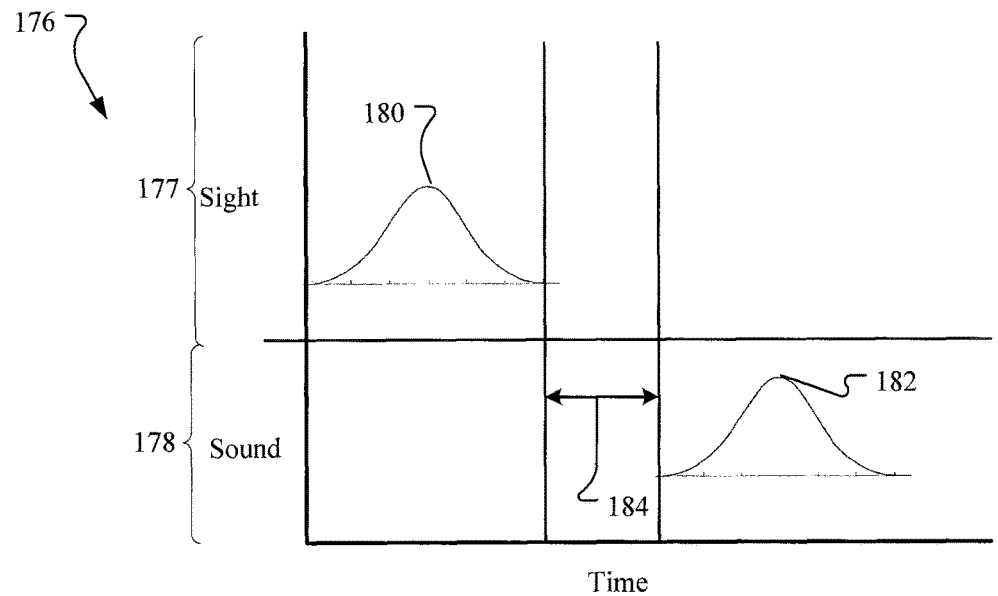

Referring to FIG. 4A, diagram 176 displays waveforms 180, 182 that represent a communication stream. Diagram 176 includes portion 177 for display of waveform 180 that represents sight information included in the communication stream. Diagram 176 also includes portion 178 for display of waveform 182 that represents sound information included in the communication stream.

Communications processing device 106 detects sound input (represented by waveform 180) and sight input (represented by waveform 182) in the communication stream. Communications processing device 106 also detects time lag 184 between the sound input (represented by waveform 180) and the sight input (represented by waveform 182). Communications processing device 106 executes weighting rules to determine when to apply predetermined weighted values to sound and sign inputs (e.g., as shown in Table 1) and when to apply time based weighted values (e.g., as shown in Table 2). The weighting rules specify a time threshold. When the time lag exceeds the time threshold, communications processing device applies the time based weighted values. When the time lag is equal to or less than the time threshold, communications processing device 106 applies the predetermined weighted values. In still another variation, the weighting rules specify that the time based weighted values are applied when an input is a dependent signal and the time lag between the dependent signal and another signal that follows the dependent signal exceeds the threshold value. In this variation, the predetermined weighted values are applied for independent signals and the time based weighted values are applied to the dependent signals. Time lag 184 exceeds the time threshold value specified in the weighting rules. Communications processing device 106 applies time based weighted values to the sound input (represented by waveform 180) and the sight input (represented by waveform 182).

Figure 4B:
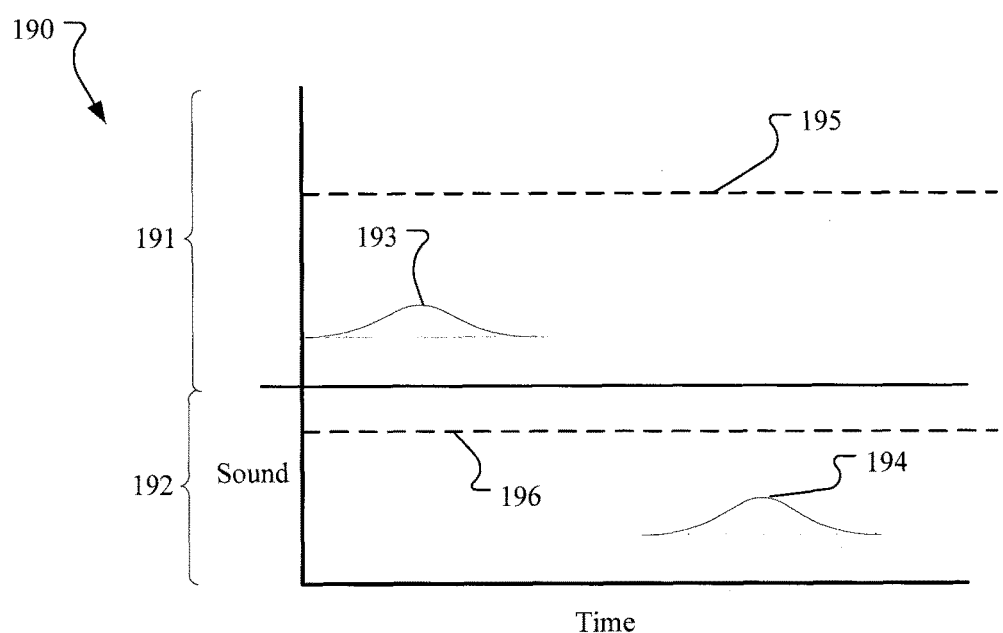

Referring to FIG. 4B, diagram 190 displays waveforms 193, 194 that results from application of weighted values to waveforms 180, 182. Diagram 190 includes portion 191 for display of waveform 193 that represents a weighted version of waveform 180. Diagram 190 also includes portion 192 for display of waveform 194 that represents a weighted version of waveform 182.

Weighted waveform 193 for sound input is generated by communications processing device 106 through application of a time based weighted value to sound input represented by waveform 180. Weighted waveform 193 is less than confidence threshold 195. A confidence threshold specifies a minimum value of an input in order for communications processing device 106 to use the value of the input without further clarification (e.g., disambiguation). Weighted waveform 194 is generated by application of a time based weighted value to waveform 182 that represents sound input. Weighted waveform 194 is less than confidence threshold 196 for sound input.

Because at least one of the weighted inputs is less than the confidence threshold, communications processing device 106 executes disambiguation engine 116 to disambiguate and to clarify the meaning of the weighted inputs that are less than the confidence threshold. There are various ways in which disambiguation engine 116 performs disambiguation. Disambiguation engine 116 performs disambiguation by prompting the user for additional information to further clarify the meaning of a dependent signal and/or of an input with a value that is less than the confidence threshold. Based on a response to the audio prompt, communications processing device 106 determines a meaning of an ambiguous input.

Disambiguation engine 116 also uses candidate patterns from the patterns library to determine a likely meaning for an ambiguous input. If a user previously has said the command "turn the light on" and had been referring to a particular light, communications processing device 106 stores information indicative of a pattern of the command "turn on the light" and information specifying which light to turn on This is accomplished through data stored in the data repository 108, which tracks historical transactions of prior successful or unsuccessful actions in interactions history 123, i.e., information indicative of prior interactions. Successful and unsuccessful transactions and recorded in the interactions history 123 through both passive monitoring (i.e. a user is able to input the command without repetition, or does not contradict the command) or active monitoring (i.e. in this example, the system may ask the user "which light did you want to turn on" and would store and associate that interaction history with the command "turn the light on").

The system will also have a probability field of signal set and spatial and capability awareness—That is, the system understands what are the candidate manipulable physical or virtual objects, and where are they in relation to the user (virtual or real) and how they can be manipulated. This spatial awareness is tracked in the data repository 108 by either the candidate manipulable physical or virtual object registering itself, or by a manual user input, or by an systematic addition to the repository (for example, though a camera measuring the location of the real objects, or a set of code measuring an interface automatically).

In a variation, the user says "turn on that light" as a dependent input and did not provide any additional context for which light to turn on. Communications processing device 106 may give an audio prompt (e.g. it may ask the user "which light would you like to turn on") or it may use other channels such as turning on one light and waiting to see if the user's gaze then moves to another light in the room, e.g., to confirm that an incorrect light was turned on.

Figure 5:
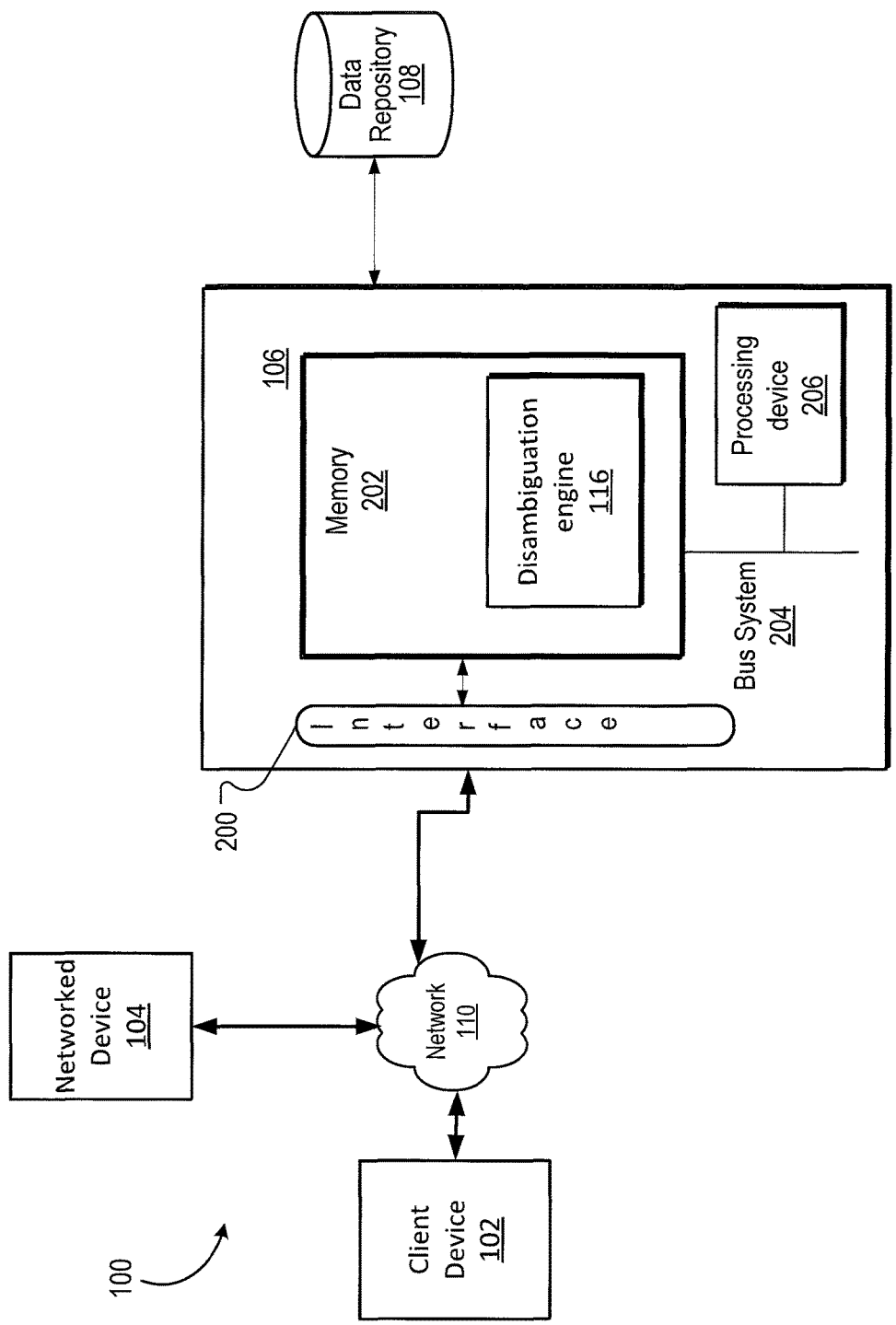
FIG. 5 is a block diagram of components of a system for processing natural communications.

Referring to FIG. 5, client device 102 and networked device 104 can each be any sort of computing device capable of taking input from a user and communicating over network 110 with communications processing device 106 and/or with other client devices. For example, client device 102 and networked device 104 can each be mobile devices, desktop computers, laptops, cell phones, personal digital assistants ("PDAs"), iPhone, smart phones, iPads, servers, embedded computing systems, and so forth. Networked device 104 includes various different types of devices, including, e.g., a user controlled home automation device, a smart home device, a multi-device financial application, and so forth.

Communications processing device 106 also includes memory 202, a bus system 204, and a processor 206. Memory 202 can include a hard drive and a random access memory storage device, such as a dynamic random access memory, machine-readable media, machine-readable hardware storage devices, or other types of non-transitory machine-readable storage devices. Memory 202 stores various computer programs, e.g., disambiguation engine 116. A bus system 204, including, for example, a data bus and a motherboard, can be used to establish and to control data communication between the components of communications processing device 106. Processor 206 may include one or more microprocessors and/or processing devices. Generally, processor 206 may include any appropriate processor and/or logic that is capable of receiving and storing data, and of communicating over a network (not shown).

Communications processing device 106 can be any of a variety of computing devices capable of receiving data, such as a server, a distributed computing system, a desktop computer, a laptop, a cell phone, a rack-mounted server, cloud computing device, and so forth. Communications processing device 106 may be a single server or a group of servers that are at a same location or at different locations. Communications processing device 106 can receive data from client devices via input/output ("I/O") interface 200. I/O interface 200 can be any type of interface capable of receiving data over a network, such as an Ethernet interface, a wireless networking interface, a fiber-optic networking interface, a modem, and so forth.

Figure 6:
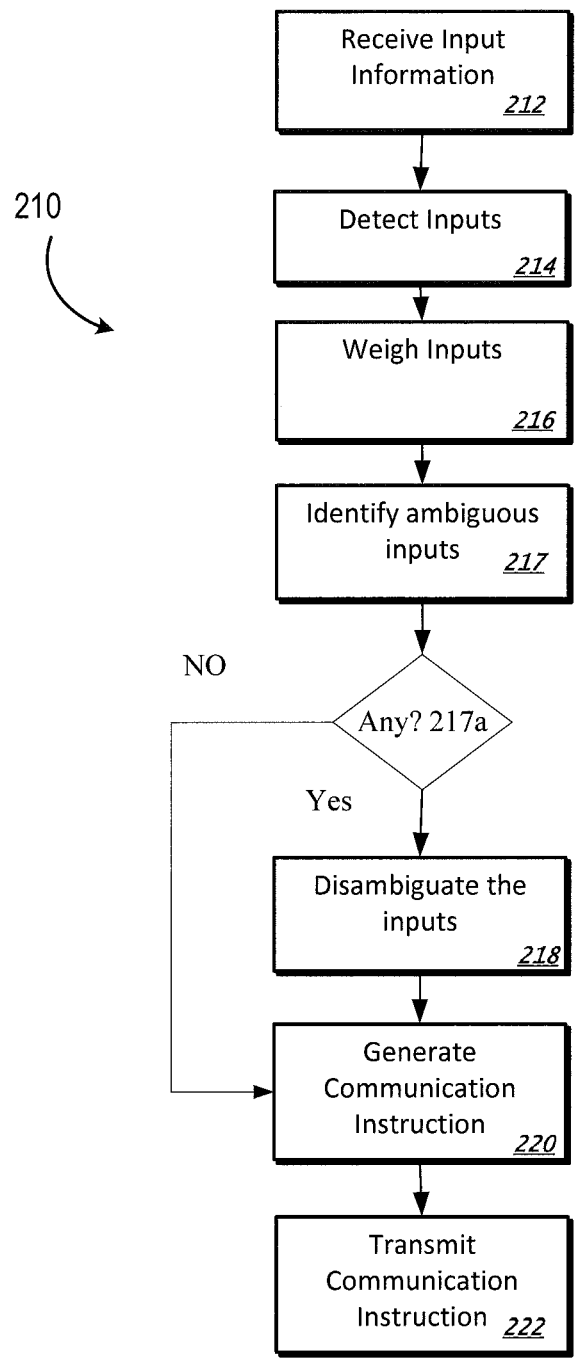
FIG. 6 is a flow chart of a process for processing natural communications.

Referring to FIG. 6, communications processing device 106 performs process 210 in processing input information to interpret a natural communication. Communications processing device 106 receives (212) from a client device input information that includes information indicative of multi-dimensional communications (e.g., information indicative of a physical gesture, a command, a gaze, a facial expression, and so forth).

Using the received input information, communications processing device 106 detects (214) various input. The input information includes a stream of information. Communications processing device 106 includes software that analyzes the stream of information to detect different types of inputs. The software is configurable to detect audio information in the streamed information and to recognize images that are indicative of physical gestures, eye movements and facial movements.

Communications processing device 106 weighs (216) the various different types of inputs. There are various types of weight rules, e.g., weight rules that are based on a time lag between inputs, weight rules that are based on an input being an independent input or a dependent input, weight rules that are based on predetermined values being assigned to various types of inputs, and any combination thereof.

For weight rules that are based on a time lag between inputs, communications processing device 106 determines an amount of time lag between the various inputs. When an amount of time lag exceeds a time threshold value, communications processing device 106 executes a time based weight rule, e.g., as shown in Table 2 above. When an amount of time lag is equal to or less than the time threshold value, communications processing device 106 assigns a predetermined weighted value to an input.

Using the weighted inputs, communications processing device 106 identifies (217) ambiguous inputs, e.g., inputs with a confidence level that is less than a confidence threshold. The confidence level is the weighted value of the input. When a confidence level is less than a confidence threshold, communications processing device 106 determines that the input is an ambiguous input.

If there are any ambiguous inputs 217a, the communications processing device 106 disambiguates (218) the ambiguous inputs, e.g., by prompting the user for additional information, otherwise the communications processing device 106 proceeds to generate a communication instruction 220. Communications processing device 106 also disambiguates an ambiguous input by accessing (e.g., in a patterns library) information indicative of patterns of previously requested actions. Using the patterns, communications processing device 106 searches for a pattern (e.g., information specifying an audio command to perform a specific action) that matches at least a portion of the ambiguous input. Upon detection of a corresponding pattern, communications processing device 106 selects the patterns assigns the ambiguous output to be the pattern.

Following disambiguation of the inputs, communications processing device 106 generates (220) a communication instruction to perform an action that is specified by the input information. For example, the communication instruction includes a command to turn a light on that is located in a left-most corner of a room. Communications processing device 106 transmits (222) the communication instruction to a networked device for execution of the action. The networked device is connected (via a network) to the light and executes the instruction to cause the light to turn on.

Embodiments can be implemented in digital electronic circuitry, or in computer hardware, firmware, software, or in combinations thereof. Apparatus can be implemented in a computer program product tangibly embodied or stored in a machine-readable storage device for execution by a programmable processor; and method actions can be performed by a programmable processor executing a program of instructions to perform functions by operating on input data and generating output. The techniques described herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Other embodiments are within the scope and spirit of the description and the claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments have been described. Nevertheless, it will be understood that various modifications may be made without departing from the spirit and scope of the claims and the examples of the techniques described herein.

What is claimed is:

1. A computer-implemented method, comprising:
   receiving by one or more computer systems input information that represents a multidimensional communication that comprises at least two different communication domains;
   detecting, by the one or more computer systems based on contents of the input information, at least two different communication inputs, corresponding to the at least two different communication domains;
   determining, by the one or more computer systems, corresponding weighted values for each to one or more of the at least two different communication inputs, with a weighted value based on a communication domain weight value divided by a time interval between receiving a first one of the at least two different communication inputs and a subsequent one of the at least two different communication inputs;
   assigning, by the one or more computer systems, confidence levels to the at least two different communications inputs, with the confidence levels being based on the weighted values;
   determining, by the one or more computer systems, which of the confidence levels are below a confidence threshold;
   executing, by the one or more computer systems, one or more disambiguation rules to disambiguate between the at least two different communication inputs when the assigned confidence levels are below the confidence threshold; and
   generating, by the one or more computer systems, a communication instruction to perform an action that is specified by the multi-dimensional communication.

2. The computer-implemented method of claim 1, further comprising:
   determining, based on execution of the one or more disambiguation rules, a meaning of the multi-dimensional communication.

3. The computer-implemented method of claim 2, wherein the generated communication instruction is based on the determined meaning.

4. The computer-implemented method of claim 1, wherein the first one of the two different domains is a speech domain and detecting further comprises:
   detecting the speech input;
   subsequently, detecting a second one of the at least two communication inputs; and
   determining whether the speech input is free of conflicts with the second one of the at least two communication inputs.

5. The computer-implemented method of claim 4 wherein when there is a conflict, further comprising:
   transmitting, to a client device, an audio prompt that requests additional information to promote disambiguation of at least first and second ones of the communication inputs.

6. The computer-implemented method of claim 1, further comprising:
   transmitting the communication instruction to a networked device for execution of the communication instruction.

7. The computer-implemented method of claim 1, wherein the at least two different communication domains are selected from speech, facial gesture, eye gaze, physical motion, and biometric measurement.

8. A computer program product tangibly stored on a computer readable hardware storage device, the computer program product comprising instructions for causing one or more processing devices to:
   receive input information that represents a multi-dimensional communication that comprises at least two different communication domains;
   detect based on contents of the input information, at least two different communication inputs, corresponding to the at least two different communication domains;
   determine one or more corresponding weighted values for each of the at least two different communication inputs, with a weighted value based on a communication domain weight value divided by a time interval between receiving a first one of the at least two different communication inputs and a subsequent one of the at least two different communication inputs;
   assign confidence levels to the at least two different communications inputs, with the confidence levels being based on the weighted values;
   determine which of the confidence levels are below a confidence threshold;
   execute one or more disambiguation rules to disambiguate between the at least two different communication inputs when the assigned confidence levels are below the confidence threshold; and
   generate a communication instruction to perform an action that is specified by the multidimensional communication.

9. The computer program product of claim 8, further comprising instructions for causing the one or more processing devices to:
   determine, based on execution of the one or more disambiguation rules, a meaning of the multi-dimensional communication.

10. The computer program product of claim 9, wherein the generated communication instruction is based on the determined meaning.

11. The computer program product of claim 8, wherein the first one of the two different domains is a speech domain and the instructions to detect further comprise instructions to:
   detect the speech input;
   subsequently, detect a second one of the at least two communication inputs; and
   determine whether the speech input first one of the at least two communication inputs is free of conflicts with the second one of the at least two communication inputs.

12. The computer program product of claim 11, further comprising instructions for causing the one or more processing devices to:
   transmit, to a client device, an audio prompt that requests additional information to promote disambiguation of at least first and second ones of the communication inputs.

13. The computer program product of claim 8, further comprising instructions for causing the one or more processing devices to:
   transmit the communication instruction to a networked device for execution of the communication instruction.

14. The computer program product of claim 8, wherein the at least two different communication domains are selected from more of speech, facial gesture, eye gaze, physical motion, and biometric measurement.

15. A system comprising:
   one or more processing devices; and
   a computer program product tangibly stored on a computer readable hardware storage device, the computer program product comprising instructions for causing the one or more processing devices to:
      receive input information that represents a multi-dimensional communication, that comprises at least two different communication domains;
      detect based on contents of the input information, at least two different communication inputs, corresponding to the at least two different communication domains;
      determine one or more corresponding weighted values for each of the at least two different communication inputs, with a weighted value based on a communication domain weight value divided by a time interval between receiving a first one of the at least two different communication inputs and a subsequent one of the at least two different communication inputs;
      assign confidence levels to the at least two different communications inputs, with the confidence levels being based on the weighted values;
      determine which of the confidence levels are below a confidence threshold;
      execute one or more disambiguation rules to disambiguate between the at least two different communication inputs when the assigned confidence levels are below the confidence threshold; and
      generate a communication instruction to perform an action that is specified by the multi-dimensional communication.

16. The system of claim 15, further comprising instructions for causing the one or more processing devices to:
   determine, based on execution of the one or more disambiguation rules, a meaning of the multi-dimensional communication.

17. The system of claim 16, wherein the generated communication instruction is based on the determined meaning.

18. The system of claim 15, wherein the first one of the two different domains is a speech domain and the instructions to detect further comprise instructions to:
   detect the speech input;
   subsequently, detect a second one of the at least two communication inputs; and
   determine whether the speech input first one of the at least two communication inputs is free of conflicts with the second one of the at least two communication inputs.

19. The system of claim 18, further comprising instructions for causing the one or more processing devices to:
   transmit, to a client device, an audio prompt that requests additional information to promote disambiguation of at least first and second ones of the communication inputs.

20. The system of claim 15, further comprising instructions for causing the one or more processing devices to:
   transmit the communication instruction to a networked device for execution of the communication instruction.

21. The system of claim 15, wherein the at least two different communication domains are selected from more of speech, facial gesture, eye gaze, physical motion, and biometric measurement.

* * * * *